Aug. 14, 1945. W. VAN B. ROBERTS 2,381,928
FREQUENCY MODULATED PULSE SIGNALING
Filed March 5, 1942
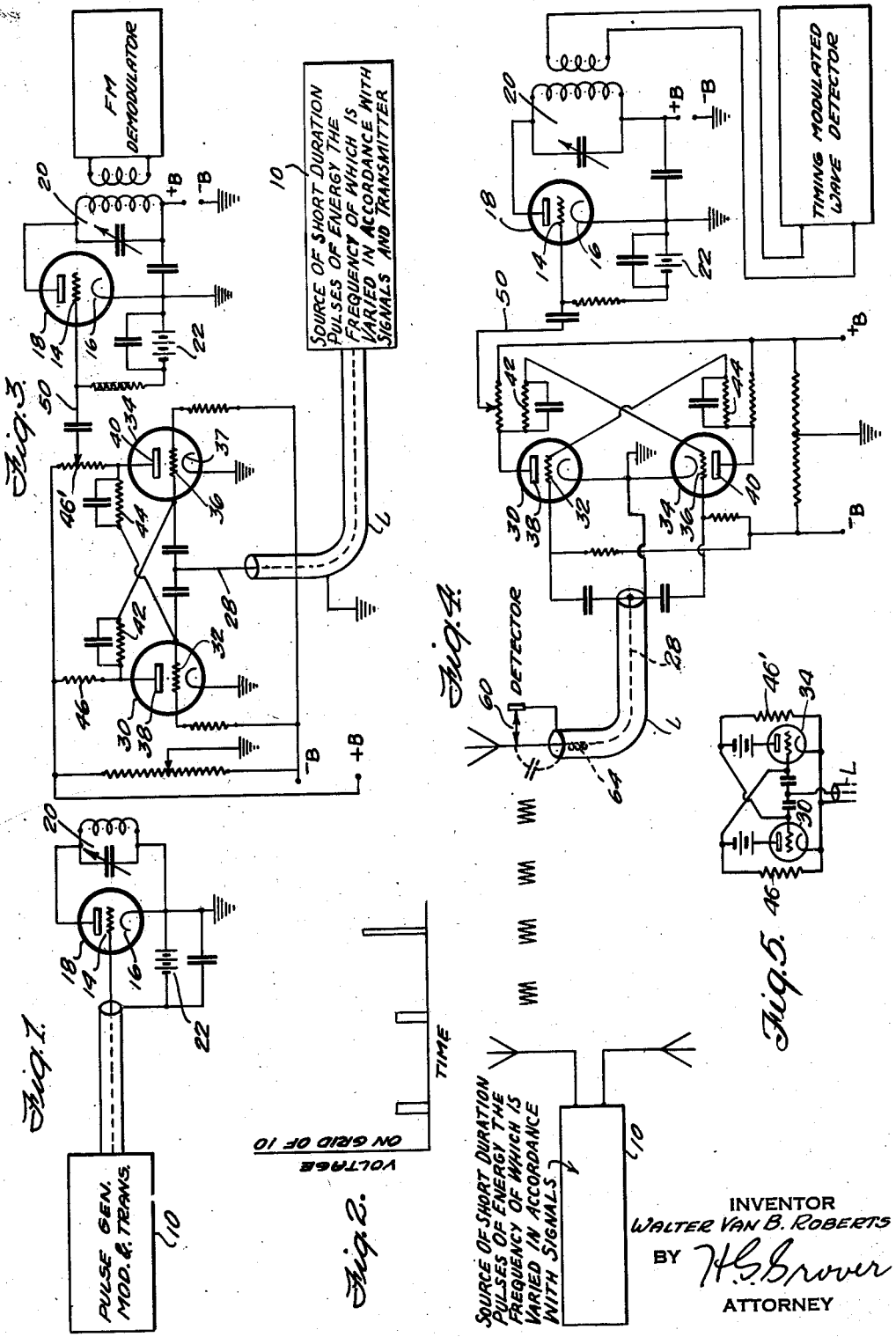
INVENTOR
WALTER VAN B. ROBERTS
BY H.G. Grover
ATTORNEY Patented Aug. 14, 1945

2,381,928

UNITED STATES PATENT OFFICE 2,381,928

FREQUENCY MODULATED PULSE SIGNALING

Walter van B. Roberts, Princeton, N. J., assignor to Radio Corporation of America, a corporation of Delaware Application March 5, 1942, Serial No. 433,460

6 Claims. (Cl. 250—6)

This application concerns a new and improved signaling system wherein pulses of energy of short and equal duration are generated at a frequency controlled by signals and used to convey the signals from one point to another. At the receiver the pulses are used to control a device that produces pulses of the same frequency but of an amplitude which is constant as long as the transmitted pulses are of intensity above a selected value. I select a value such as to be above the noise components inherent in the system. The receiver will not respond to noise having a peak value below this threshold. The produced pulses may excite a resonant circuit the output of which may be impressed upon any desired type of frequency modulation detector to derive the signal. Since the receiver responds only to signals having a peak above the threshold, my system provides substantial elimination of noise. Furthermore, since the means at the receiver responds equally to all impulses of a peak value above the selected value and since its response is not decreased by decrease in the duration of each pulse, the pulses generated at the transmitter may be made of very short duration with a corresponding increase in their peak value without an increase in the average power expended. Viewed in a different manner, by reducing the duration of pulses each of which provides a peak value such as to exceed the receiver threshold, a big reduction in the necessary average transmitter power is attained.

Wherever the term frequency modulation has been used throughout this specification it should be understood to refer to any modulation where the instantaneous frequency of the transmitted wave is varied by the application of modulating voltage of an alternating character such as music or speech. There are many possible functional relations between the instantaneous wave frequency and the modulating voltage which are or can be used. For example, if the instantaneous frequency is caused to shift in direct proportion to the instantaneous voltage of the modulating voltage, there results one common form of frequency modulation, or if the instantaneous frequency is caused to vary as the time integral of the modulating voltage there results a type of frequency variation which is usually called phase modulation because it is equally correctly and somewhat more simply definable as a modulation which causes the phase of the transmitted waves to shift in direct proportion to the instantaneous voltage of the modulating voltage. In other words, the terms phase modulation and frequency modulation are tied together by the fact that a changing frequency necessitates a changing phase and vice versa. Furthermore, in many practical systems going under the name of FM, the instantaneous frequency does not vary directly as the voltage of the modulating voltage, nor yet as its integral, but in some intermediate fashion. Regardless of the exact nature of the functional relation mentioned above, however, the system of the present invention can be employed and hence the term FM must be taken in the broad sense here defined.

In describing my invention reference will be made to the attached drawing wherein:

Fig. 1 shows schematically a pulse generator and resonant circuit excited thereby;

Fig. 2 illustrates the nature of the generated pulses;

Figs. 3 and 4 illustrate pulse generating, modulating, transmitting and receiving means arranged in accordance with my invention, while Fig. 5 is a simplified showing of a feature of the systems of Figs. 3 and 4. Fig. 5 is used to describe the operation of the said feature.

Refer now to Figs. 1 and 2 and assume that pulses are generated in unit 10 and transmitted to the input electrodes 14 and 16 of tube 18. Assume also a constant frequency for the pulses. If the pulse duration is short compared to the pulse separation or period, the plate current pulse will shock excite the tank circuit 20 with nearly constant efficiency so that the resulting sinusoidal voltage in this tank circuit will be nearly independent of the peak value of the pulse if the total energy of the plate current pulse is kept constant. For example, the third pulse of Fig. 2 has twice the amplitude of the others, but as its duration is only half as great its effect on the tank circuit will be the same.

Assume also that grid bias 22 is sufficiently more than cut off so that noise voltages cannot produce any plate current between pulses. Then for a given sinusoidal voltage developed in the tank circuit 20 it is considered evident that noise components are reduced in proportion with reduction of the pulse duration. This general method of improving the signal to noise ratio without increasing transmitted average power is known in the art. The voltage developed across the tank circuit can be applied to either an amplitude modulation or frequency modulation detecting system, according as the amplitude or the frequency of the pulses is modulated at the transmitter.

In Fig. 3, however, in accordance with the present invention, a still better result is obtained. Here the pulses are applied to the tube 18 by way of a divider circuit, known in the art of Geiger counters. Counting and dividing circuits are well known in the art as is the operation thereof. In my arrangement the generated and modulated pulses from unit 10 are supplied by the lead 28 of line L to the grids 32 and 36 of tubes 30 and 34. The anodes 38 and 40 and grids 36 and 32 are cross-coupled by resistances 42 and 44. The arrangement is such that when one tube starts to draw current, say tube 30, the drop in potential in the anode resistance 46 is applied to the grid 36 to bias it more negative so that tube 34 is cut off and tube 30 draws heavy current. The resistance 46' in the anode circuit of tube 34 in like manner supplies a bias for grid 32 when tube 34 draws current.

The arrangement in the absence of a control potential on grids 32 and 36 is such that the system is unstable so that one or the other tube starts to draw current and due to the action described above this tube draws heavy current and the other tube is cut off. Assume that tube 30 draws current and tube 34 is cut off and pulses are impressed on the grids 32 and 36. If a pulse of one polarity is applied nothing happens. If a sufficiently strong pulse of the other polarity is applied however, it swings the system over to its other equilibrium condition in which the current in tube 30 is cut off and a large current flows in tube 34. Thus a series of short duration pulses applied to the divider input results in a corresponding series of substantially square waves of voltage at the divider output.

The circuits between line L and lead 50 in Figs. 3 and 4 are circuits well known in this art of Geiger counters. As they are identical in these two figures, reference will be made to Fig. 3.

In the first place, the circuit referred to is somewhat more complicated than necessary for an understanding of its operation because it is arranged to operate from a single source of potential —B, +B. It may therefore be of assistance to the explanation to refer to Fig. 5 wherein the same circuit arranged for operation with individual batteries is shown.

Let us suppose that there is a plate current flowing through tube 34. This makes the upper end of resistor 46' strongly negative. Hence the grid of 30 is also so negative that no plate current flows through 30 and hence the upper end of 46, and grid of 34, are at ground potential, which is consistent with the original assumption that current flows through 34. Thus in the absence of any impulse from line L, the tube 30 remains shut off while tube 34 passes a current determined by its plate battery, resistance 46', and the characteristic of the tube at zero grid bias.

Now let us suppose a pulse of positive potential is applied from line L through the condensers to both grids, and that this pulse is insufficient to cause any current to flow in tube 30 because its bias is so much greater than required for cut-off. Then the only effect of the pulse is to slightly increase the current through 46' and hence the bias on tube 30. (Even if the pulse were strong enough to cause some current to flow momentarily through tube 30, this current would never be as great as the current through tube 34 so that when the pulse subsided the system would revert to its original condition.)

But now suppose a negative pulse is applied. This pulse reduces the current through 46' and hence increases the potential of the grid of tube 30 more than enough to offset the negative potential impressed on the junction of the condensers. Current begins to flow through 46 thus making the grid of 34 even more negative than the pulse above would make it. The action is cumulative and the system does not come to a stable condition until the current through 34 is cut off while that through 30 attains the value originally flowing in 34.

It would make no difference to the usefulness of the circuit in the present invention if pulses of alternate polarity were required to switch the condition of the circuit back and forth between its two equilibrium conditions. However, the fact is that only pulses of one polarity are effective, and this is the reason that this circuit is used in Geiger counters for producing only one output pulse (over lead 50) of a given polarity for each two successive negative pulses fed into it (via line L).

The above explanation of the switching action is admittedly qualitative and does not explain why, after the currents in the two tubes become equal, the system always shifts over into its other equilibrium condition rather than return to its original condition. To explain this it is probably necessary to bring into the picture some very small amount of inductance inherent in the wires of the circuit. (See van der Pol "Relaxation Oscillations," Phil. Mag. November 1926, pages 990–991 and Fig. 5).

In Fig. 3 of the present application the same operation takes place as just described, but resistors 42, 44 and the resistors between grids and —B are added to make the bias of either of the tubes small or positive when the other is passing current. The condensers across 42 and 44 are to permit rapid change of plate potential of either tube to pass freely to the grid of the other tube. The condensers between the grids and line L are to permit passage of sudden changes of line potential without affecting the D. C. potential of the grids.

The actuation of this divider depends only on pulse peak value and not on its duration. Hence, if the divider is adjusted with enough "threshold" so that it will not be actuated by noise, then the average power required of the transmitter will be less, the shorter the duration of the pulse. The divider circuit is coupled by lead 50 to the grid 14 of the tube 18 and the pulses generated in the divider excite the tuned tank circuit 20 with the result that theoretically at least, full tank power is produced by infinitely small average transmitter power if the transmitter pulse duration is made correspondingly small compared to pulse separation or period. This is in contrast with Fig. 1 where the required transmitter power is in a fixed relation to the tank power. Thus in Fig. 3 there is maintained the improvement in noise reduction obtained by using short pulses (the feature of Fig. 1) and in addition it is made possible to reduce the transmitter average power without reducing the response in the receiver tank 20.

It should be noted that since the output of the divider has an amplitude substantially independent of pulse input amplitude, modulation of the pulses must be a modulation of their frequency or phase, and a frequency or phase detecting system is connected to the divider output or to the tank circuit 20.

For the sake of simplicity, a single concentric line has been shown as a transmission medium. The invention, however, is particularly adapted to ultra short wave space transmission systems, especially where the waves are so short as to be more readily detected than amplified. Such a system has been shown in Fig. 4.

Here, by shortening the generated pulses used to modulate the wave sufficiently, the high frequency wave amplitude may be correspondingly increased so that a simple crystal detector 60 connected to the receiving antenna will deliver short direct current pulses through wave frequency choke 64 of sufficient peak voltage to actuate the divider. This is in contrast to systems whose output depends not on peak voltage alone but also on pulse duration. The receiver shown in Fig. 4 has its detector so poled that the pulses of rectified voltage traversing line L are of the correct sign to actuate the electronic switching circuit. The frequency of the pulses is controlled by the signals and as a consequence the wave generated in 20 is correspondingly modulated as to frequency. These new waves, of considerable and constant amplitude, are free of noise. The output of 20 is supplied to utilizing means such as a detector of frequency modulated waves. Any suitable type of FM detector may be utilized for detecting the FM waves set up in tank 20, but the simplest means, especially where the ratio of maximum pulse frequency to minimum pulse frequency is considerably greater than unity in the presence of maximum account of frequency modulation, is perhaps the use of the divider circuit output in the manner set forth in my copending U. S. application, Serial No. 354,982, filed August 31, 1941, now Patent #2,286,377, dated June 16, 1942, Figure 3. In this case the tuned circuit and auxiliary FM detecting means are not required. For example, if in Fig. 4 herewith, the tube energized through lead 50 is biased to cut off, and the coil in its plate circuit is replaced by telephones, the original modulation will be heard. This is because each positive square wave of voltage in lead 50 produces the same time integral of voltage on the grid it drives and thus produces an average plate current proportional to wave frequency. The negative square waves produce no plate current of course, so may be forgotten.

It will thus be evident that not only ordinary FM detectors may be used in my present system, but also any special FM detectors which require square waves of voltage for their operation.

What is claimed is:

1. A receiver for short substantially constant duration pulses of radio frequency waves whose pulse frequency is modulated in direct accordance with signal voltage including, rectifying means excited by said waves for producing short pulses of rectified voltage the rate of repetition of which varies in accordance with the signals, frequency detecting means having an output which is independent of the duration of said rectified pulses and which, for peak values of said rectified pulses above a threshold value, varies solely with the frequency of said pulses and connections for impressing said pulses of rectified voltage on said detecting means.

2. In a signaling system, means for generating pulses of high frequency energy of constant amplitude, constant short duration, and of a rate varied in accordance with signals, means excited by said pulses of high frequency energy for transmitting said pulses, means excited by said transmitted waves for rectifying said waves to produce constant intensity, constant short duration pulses of direct current energy the rate of recurrence of which varies in accordance with said signals, means responsive to the peak value of said direct current pulses of more than predetermined threshold value for producing an integrally related series of relatively long duration, constant amplitude pulses, and a demodulator for said long duration pulses responsive to frequency variations of said pulses.

3. In a signaling system, means for generating pulses of high frequency energy of constant amplitude, constant short duration, and of a rate varied in accordance with signals, means excited by said pulses of high frequency for transmitting said pulses, a rectifier excited by the high frequency waves for rectifying said waves to produce constant short duration pulses of direct current energy the rate of recurrence of which varies in accordance with the modulations on said high frequency energy, means responsive to the peak value of said direct current pulses which exceed a predetermined threshold value for producing a correspondingly related series of relatively long duration, constant amplitude pulses, a resonant circuit coupled to said last named means for producing sine wave energy the frequency of which is modulated in accordance with the rate of recurrence of said constant amplitude pulses and a frequency modulated wave demodulator coupled to said resonant circuit.

4. The method of demodulating short substantially constant duration pulses of radio frequency wave energy the pulse frequency of which is modulated substantially directly in accordance with signals including these steps, deriving from said pulses of radio frequency wave energy relatively long and constant duration pulses of direct current energy the rate of repetition of which varies in accordance with the signals, and deriving from said pulses of direct current energy an output the intensity of which is independent of the duration of said pulses of energy, the intensity of which output varies solely in accordance with the frequency of said pulses of direct current energy.

5. The method of demodulating short substantially constant duration pulses of radio frequency wave energy the pulse frequency of which is modulated substantially directly in accordance with signals including these steps, rectifying said pulses of radio frequency wave energy to derive therefrom short constant duration pulses of direct current energy the rate of repetition of which varies in accordance with the signals, deriving from said pulses of direct current energy integrally related voltage pulses of corresponding duration and repetition, and deriving from said voltages an output the intensity of which is independent of the duration of said voltage pulses, where the peak value of said voltage pulses exceed a selected value, and which output intensity varies solely in accordance with the frequency of said voltage pulses.

6. Receiving apparatus for demodulating waves in the form of pulsed radio frequency energy, the pulses being modulated in frequency in accordance with a signal, comprising an antenna for picking up said waves, a detector for detecting waves derived from said antenna, said detector producing in its output pulses frequency modulated in accordance with the signal transmitted, a pair of electron discharge systems, each having anode, cathode and grid electrodes, said systems being connected so as to have two conditions of electrical stability wherein when one system is conducting the other is cut off and vice versa, a connection from said detector to the grids of said systems whereby the detected pulses change the tubes from one condition of stability to another, and circuits coupled to the output electrodes of one of said electron discharge systems for translating the pulsed output thereof into the signal transmitted.

WALTER van B. ROBERTS.